UNITED STATES PATENT OFFICE.

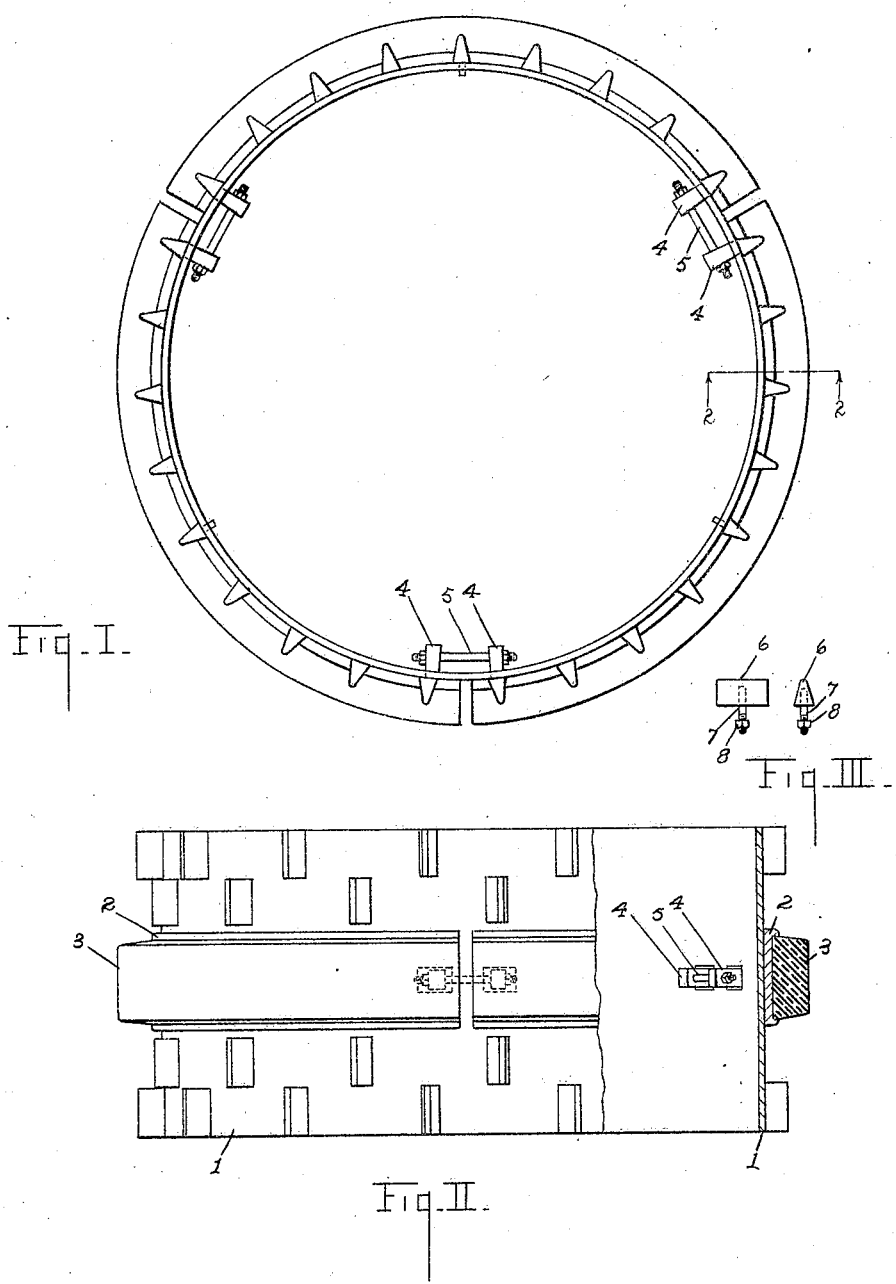

EDMUND E. HANS, OF KALAMAZOO, MICHIGAN.

WHEEL.

1,378,025.  Specification of Letters Patent.  Patented May 17, 1921.

Application filed March 6, 1918. Serial No. 220,827.

*To all whom it may concern:*

Be it known that I, EDMUND E. HANS, a citizen of the United States, residing at the city and county of Kalamazoo and State of Michigan, have invented certain new and useful Improvements in Wheels, of which the following is a specification.

This invention relates to improvements in wheels and particularly to improvements in traction wheels for tractors or trucks.

The objects of the invention are:

First, to provide a wheel for a tractor or truck adapted to both soft ground and to a hard pavement or ground.

Second, to provide a construction of wheel which for hard ground has a cushion tire surface and for soft ground has a broad resisting surface provided with traction lugs.

Third, to provide an improved construction of wheel in which the parts can be readily assembled and disassembled for convenience in manufacture and for the replacement of worn parts.

Further objects and objects relating to details and economies of construction and operation will definitely appear from the detailed description to follow.

I accomplish the objects of my invention by the devices and means described in the following specification. The invention is clearly defined and pointed out in the claim.

A structure which is a preferred embodiment of my invention is fully illustrated in the accompanying drawings forming a part of this specification, in which:

Figure I is a side elevation of a traction wheel rim, the spokes and the hub being omitted.

Fig. II is a plan view of the same, a portion being cut away on line 2—2 of Fig. I to show details.

Fig. III are detail views of one of the detachable lugs.

In the drawings, similar numerals of reference refer to similar parts throughout the several views.

Considering the numbered parts of the drawing, a broad rim 1 is provided for the wheel, which rim is supported by any usual or convenient wheel center. Centrally disposed on the circumference of the rim is a rubber or cushion tire, which is preferably made up of rubber cushion 3 which is preferably made up of sections vulcanized upon metal supporting back plate 2. The metal supporting plates are provided at their opposite ends with radially disposed lugs 4 which are disposed through suitable apertures in the rim. These lugs are perforated transversely in the central plane of the wheel and are provided with bolts 5 for securing the same in position and putting tension upon parts and adjusting the same to take care of expansion. A considerable space from one-half an inch to an inch is provided between these sections to permit of this adjustment. The space is of advantage in insuring the traction of the cushion.

I have shown the wheel with the tire divided into three parts. It can, of course, be divided up into a smaller number of parts or be merely divided into halves and this principle can be applied, although not so conveniently and effectively as when the tire is divided into three equal sections.

I also desire to remark that a continuous tire can be provided with means for securing it in place, but this lacks many of the advantages of the sectional structure as it would be necessary to detach the traction lugs and dispose them on one side of the rim in order to facilitate the removal of the tire. There would not be the advantages of the sectional construction of the tire which has an advantage in that it is more effective as a tractor when made in sections a little separated from each other owing to the superior engagement with the ground or pavement. The continuous cushion would lack in facility of repair.

The rubber or cushion portion of the tire occupies a comparatively narrow zone in the center of the wheel, and on the broad rim at each side of the cushion tire are disposed traction lugs 6 secured in place by screw bolt shanks 7 disposed through the rim and held in place by nuts 8, thus making the lugs detachable and readily removable. Side and end elevation of a single traction lug appears in Fig. III. The lugs I have illustrated are such as are already in use for purposes of this kind. The lugs can be of any desired form, it being a requirement that they be of lesser height than the radial height of the tire cushion supported on the same rim.

With this construction of wheel, it will be observed that as the truck or tractor travels upon a pavement, it will be carried by the cushion tire at the center and the lugs will be held out of engagement with the pavement, thereby avoiding the abrasion and vibration. A rubber cushion tire under such circumstances provides sufficient traction for all ordinary purposes. However, when the truck or tractor passes onto soft ground, the rubber tire is entirely inadequate and if the soil is damp, becomes "greased over" and slips very readily through the soil. In my improved construction this is not of consequence because the rubber tire, being comparatively narrow, at once settles into the ground and the broad surface of the rim then rests on the ground, the ground being somewhat compacted by being forced to each side by the central tire cushion. The traction lugs then engage the ground and serve as a very effective propelling means, and as the ground under such circumstances is soft and yielding, the cushion effect of the tire cushion at the center is not needed.

With my improved wheel, it is possible for a truck or tractor to do very heavy work, pulling on soft ground and all that sort of work and when the truck or tractor comes to a hard pavement, it immediately travels up on the tire cushion at the center with the lugs out of engagement and the same can be speeded up so that the full advantage of speed is attained where the going is good, also there is an advantage in returning from a heavy haul where the rig is returned empty, because under such circumstances even on comparatively soft roads, the travel will be on the relatively narrow tire cushion and a good rate of speed can be made.

While I have shown the form of lug and the form of cushion tire preferred by me, I desire to remark, that they can be greatly varied without departing from the broad features of my invention.

Having thus described my invention, what I claim as new and desire to secure by Letters Patent is:

In a wheel, the combination of an apertured rim, a centrally disposed tire cushion made up of segments of rubber cushion supported on metal plates, radially disposed lugs at the end of each plate, disposed through the apertures in the rim, and connecting bolts through the said lugs for retaining the same removably and adjustably in position.

In witness whereof, I have hereunto set my hand and seal in the presence of two witnesses.

EDMUND E. HANS. [L. S.]

Witnesses:
LUELLA G. GREEFIELD,
MARGARET L. GLASGOW.